US006911489B2

(12) United States Patent
Baron et al.

(10) Patent No.: US 6,911,489 B2
(45) Date of Patent: Jun. 28, 2005

(54) METHODS FOR PREPARING AGGLOMERATED PELLETS OF POLYTETRAFLUOROETHYLENE AND MOLDED ARTICLES AND THE AGGLOMERATED PELLETS OF POLYTETRAFLUOROETHYLENE AND MOLDED ARTICLES PREPARED THEREBY

(75) Inventors: Pamela J. Baron, Exton, PA (US); Gary Eckrote, Chester Springs, PA (US); Tonya James, Winston-Salem, NC (US); Ronald Partridge, Royersford, PA (US); Timothy C. Duzick, Hockessin, DE (US)

(73) Assignee: Asahi Glass Fluoropolymers USA, Inc., Chadds Ford, PA (US)

( * ) Notice: Subject to any disclaimer, the term of this patent is extended or adjusted under 35 U.S.C. 154(b) by 0 days.

(21) Appl. No.: 10/165,323

(22) Filed: Jun. 10, 2002

(65) Prior Publication Data

US 2003/0229167 A1 Dec. 11, 2003

(51) Int. Cl.[7] .................................. C08L 3/00
(52) U.S. Cl. ................... 523/330; 523/223; 521/79; 524/265; 524/366; 524/545; 524/546; 524/440; 524/439
(58) Field of Search .................. 524/265, 545, 524/546, 366; 523/223, 330; 521/79

(56) References Cited

U.S. PATENT DOCUMENTS

| | | | |
|---|---|---|---|
| 2,946,763 A | 7/1960 | Bro et al. .................... 260/455 |
| 2,955,099 A | 10/1960 | Mallouk et al. ............. 260/457 |
| 3,085,083 A | 4/1963 | Schreyer ..................... 260/87.5 |
| 3,597,405 A | 8/1971 | Kometani et al. .......... 260/92.1 |
| 3,682,859 A | 8/1972 | Taylor et al. ........... 260/41 AG |
| 3,882,217 A | * 5/1975 | Banham et al. ............. 264/117 |
| 3,915,916 A | 10/1975 | Leverett ................ 260/29.6 F |
| 3,929,721 A | 12/1975 | Leverett .................. 260/42.15 |
| 3,983,200 A | * 9/1976 | Browning ................... 264/117 |
| 4,016,345 A | 4/1977 | Holmes ....................... 526/206 |
| 4,218,534 A | 8/1980 | LaBelle et al. ................ 435/5 |
| 4,233,181 A | 11/1980 | Goller et al. ............. 252/425.3 |
| 4,370,436 A | 1/1983 | Nakamura et al. .......... 524/322 |
| 4,576,869 A | 3/1986 | Malhotra .................... 428/502 |
| 4,624,058 A | 11/1986 | Nakayasu et al. ............. 34/10 |
| 4,908,415 A | * 3/1990 | Aramaki et al. ............ 525/356 |
| 5,182,119 A | * 1/1993 | Edens ......................... 425/222 |
| 5,321,059 A | 6/1994 | Honda et al. ............... 523/212 |
| 5,386,647 A | 2/1995 | Bauer et al. .................. 34/582 |
| 5,502,161 A | 3/1996 | Harvey et al. .............. 528/494 |
| 5,679,741 A | 10/1997 | Breton et al. ................. 525/71 |
| 5,710,205 A | 1/1998 | Davies et al. ............... 524/505 |
| 5,763,082 A | 6/1998 | Kokumai et al. ........... 428/402 |
| 5,804,654 A | 9/1998 | Lo et al. ........................ 525/67 |
| 6,099,774 A | 8/2000 | Löhr et al. ................... 264/117 |
| 6,177,533 B1 | 1/2001 | Woodward ................... 526/255 |
| 6,197,862 B1 | 3/2001 | Asano et al. ................ 524/404 |
| 6,203,733 B1 | 3/2001 | Funaki et al. ................ 264/117 |
| 6,231,825 B1 | 5/2001 | Colby et al. ................. 423/286 |
| 6,255,399 B1 | 7/2001 | Araki et al. ................. 525/232 |
| 6,281,281 B1 | 8/2001 | Asano et al. ................ 524/546 |
| 6,310,126 B1 | 10/2001 | Osborn ........................ 524/274 |
| 6,350,801 B1 | 2/2002 | Asano et al. ................ 524/377 |
| 2002/0161083 A1 | * 10/2002 | Schafer et al. .............. 524/265 |

FOREIGN PATENT DOCUMENTS

| | | |
|---|---|---|
| JP | 48-37576 | 6/1973 |
| JP | 51-121417 | 10/1976 |
| JP | 53-139660 | 12/1978 |

OTHER PUBLICATIONS

Kirk–Othmer, Encyclopedia of Chemical Technology, 4th Ed., vol. 22, Wiley, New York, pp. 248–255 (1997).
ASTM International, Designation: D 4895–98, "Standard Specification for Polytetrafluoroethylene (PTFE) Resin Produced From Dispersion[1] ", pp. 1–14 (1998).
ASTM International, Designation: D 792, "Standard Test Methods for Density and Specific Gravity (Relative Density) of Plastics by Displacement[1] ", cover page and pp. 1–6, (2000).
ASTM International, Designation: D 4745–01, "Standard Specification for Filled Compounds of Polytetrafluoroethylene (PTFE) Molding and Extrusion Materials", pp. 1–6 (2001).
ASTM International Designation: D 1457–92, "Standard Specification for Polytetrafluoroethylene (PTFE) Molding and Extrusion Materials[1] ", pp. 1–15 (1992).
Kirk–Othmer, Encyclopedia of Chemical Technology, 4th Ed., vol. 11, Wiley, New York, pp. 138–171 (1994).
Kirk–Othmer, Encyclopedia of Chemical Technology, 4th Ed., vol. 11, Wiley, New York, pp. 621–644 (1994).
Kirk–Othmer, Encyclopedia of Chemical Technology, 4th Ed., vol. 22, Wiley, New York, pp. 229–236 (1997).

* cited by examiner

Primary Examiner—David W. Wu
Assistant Examiner—Henry S. Hu
(74) Attorney, Agent, or Firm—Oblon, Spivak, McClelland, Maier & Neustadt, P.C.

(57) ABSTRACT

PTFE pellets with good bulk density, homogeneity, and flowability properties may be obtained by:

(1) wetting a PTFE powder with a solvent, to obtain a wetted PTFE powder;

(2) forming the wetted PTFE powder into agglomerated pellets of PTFE; and (3) drying the agglomerated pellets of PTFE pellets, in which the drying of the agglomerated pellets of PTFE is carried out in a fluidized bed drier. The PTFE pellets so obtained may be used to prepare molded articles of PTFE.

52 Claims, No Drawings

METHODS FOR PREPARING AGGLOMERATED PELLETS OF POLYTETRAFLUOROETHYLENE AND MOLDED ARTICLES AND THE AGGLOMERATED PELLETS OF POLYTETRAFLUOROETHYLENE AND MOLDED ARTICLES PREPARED THEREBY

BACKGROUND OF THE INVENTION

1. Field of the Invention

The present invention relates to methods for preparing agglomerated pellets of polytetrafluoroethylene, including agglomerated pellets of polytetrafluoroethylene which contains one or more fillers, and the agglomerated pellets of polytetrafluoroethylene so produced. The present invention also relates to methods for preparing molded articles of polytetrafluoroethylene, including molded articles of polytetrafluoroethylene which contains one or more fillers, and the molded articles prepared thereby.

2. Discussion of the Background

Polytetrafluoroethylene (herein after referred to as "PTFE") is a useful material for the formation of molded articles. In particular, PTFE which may contain a filler such as bronze or graphite, has found application in the automotive and mechanical fields for the manufacture of piston rings and seals.

However, it is difficult to use finely powdered PTFE in applications which involve small or intricate molds. Specifically, the poor flow properties and low density of finely powdered PTFE adversely affect its ability to completely fill small or intricate molds and to afford suitable molded articles.

In response to the problems experienced with finely powdered PTFE, pelletized PTFE has been developed. PTFE pellets, also referred to as agglomerated PTFE, exhibits much better flow properties and a higher bulk density, as compared to finely powdered PTFE, and can thus be successfully used with small and intricate molds, such as molds for thin-walled sleeves.

Conventionally, PTFE has been pelletized or agglomerated by means of a process in which PTFE powder is treated with a solvent system, sometimes referred to as a wetting agent, to effect agglomeration and then dried to afford dried pellets. For example, U.S. Pat. No. 5,182,119 discloses an apparatus and method for the production of agglomerated pellets from PTFE resin powder, and discloses the use of trichloroethylene, alkyl alcohols, and water soluble alcohols plus water as the wetting agent.

U.S. Pat. No. 6,203,733 discloses a process for producing granulated PTFE powder by coagulating PTFE powder with a liquid medium containing water and a perfluoroalkyl alkyl ether. The PTFE primary powder is mixed with the liquid medium and stirred at a certain intensity to obtain the desired degree of coagulation and granulation.

U.S. Pat. Nos. 4,370,436 and 5,321,059 disclose a process for preparing a filled agglomerated PTFE molding powder by agitating finely-divided PTFE particles and a surface-treated filler in an aqueous medium, which includes a water-immiscible organic liquid.

U.S. Pat. No. 6,197,862 discloses a process for preparing a filled PTFE granular powder by stirring PTFE powder, a filler, and water in the presence of an organic liquid and a non-ionic solvent.

U.S. Pat. No. 6,281,281 discloses a process for preparing a granulated powder of filled PTFE by wetting 100 parts by weight of a mixture of PTFE powder and filler with 30 to 60 parts by weight of an aqueous solution containing an anionic surfactant in a specified concentration.

U.S. Pat. No. 6,350,801 discloses the preparation of a filled granular PTFE powder by forming an aqueous slurry of PTFE powder and a filler by using an organic liquid which forms a liquid-liquid interface with water and a nonionic surfactant and the granulating in combination of stirring and de-agglomeration.

U.S. Pat. No. 3,597,405 describes a method of agglomeration in which the polymer powder is wetted with a minor amount of a liquid having a low surface tension and the wetted powder is formed into agglomerates by, for example, a tumbling operation. After formation of the agglomerates, the liquid is removed by heating.

U.S. Pat. No. 3,682,859 discloses a similar process in which the tetrafluororoethylene polymer is wetted with an organic liquid. U.S. Pat. No. 3,882,217 describes an agglomeration process in which the tetrafluoroethylene polymer product is wetted with a small amount of a solution of a volatile non-ionic surfactant in water prior to agglomeration. U.S. Pat. No. 3,983,200 discloses a process in which tetrafluoroethylene polymer is first wetted with an aqueous solution containing a protective colloid.

In the past, particularly good results have been achieved by agglomerating PTFE powders and a filler in the presence of a mixture of water and ethanol. However, recent environmental concerns and the desire to reduce emissions of volatile solvents, such as ethanol, have prompted the search for suitable non-volatile solvent replacements for ethanol. In this regard, mixtures of water and dipropylene glycol n-butyl ether ("DPnB") have been used as the solvent system or wetting agent for the agglomeration of PTFE. However, it has been found that the PTFE pellets prepared with aqueous DPnB are inferior as compared to those prepared with aqueous ethanol. In particular, the molded articles prepared from pellets of filled PTFE prepared with a DPnB-water mixture exhibit a high degree of inhomogeneity as compared to those prepared with aqueous ethanol. In addition, molded articles prepared from such PTFE pellets can exhibit spotting.

The bulk density of the PTFE pellets is also important when preparing molding articles such as thin-walled sleeves. Such sleeves are typically manufactured by cutting a longer sleeve to the desired length on a lathe. When working with a sleeve on a lathe, a fixed length of waste material is inevitably generated at each end of the longer sleeve when it is mounted on the lathe via the chucks. PTFE particles with a low bulk density give a shorter starting sleeve and, thus, a high proportion of waste when the starting piece is cut to size on the lathe. In contrast, PTFE particles with a high bulk density afford longer starting pieces and a smaller percentage of waste upon subsequent cutting on a lathe.

The flowability of the PTFE particles is another important consideration. PTFE particles with low flowability pose problems when manufacturing molded articles, especially when using automated molded apparatus, such as failure to completely fill the mold. Incomplete filling of the mold can result in shorter products and the concomitant problems described above. PTFE pellets with good flowability are characterized by a narrow, uniform size distribution, approximate spherical shape, high hardness, and a lack of stickiness.

The absence of spotting in the PTFE pellets and the resulting molded articles is another important consideration. PTFE pellets and the molded articles which exhibit spotting are less desirable at least for aesthetic reasons. In addition, such spotting reveals a degree of inhomogeneity which may result in inferior physical and mechanical properties of the molded article, such as tensile strength, etc.

Thus, there remains a need for a method of preparing agglomerated pellets of PTFE which affords pellets which exhibit improved bulk density. There also remains a need for a method for preparing agglomerated pellets of PTFE which exhibit improved flowability. There also remains a need for a method for preparing agglomerated pellets of PTFE which exhibit a reduced spotting. There also remains a need for the pellets prepared by such a process. There also remains a need for a method for preparing molded articles from such agglomerated pellets of PTFE and the molded articles so produced.

SUMMARY OF THE INVENTION

Accordingly, it is one object of the present invention to provide novel methods for preparing agglomerated pellets of PTFE.

It is another object of the present invention to provide novel methods for preparing agglomerated pellets of PTFE which affords agglomerated pellets of PTFE which exhibit improved bulk density.

It is another object of the present invention to provide novel methods for preparing agglomerated pellets of PTFE which affords agglomerated pellets of PTFE which exhibit good homogeneity properties.

It is another object of the present invention to provide novel methods for preparing agglomerated pellets of PTFE which affords agglomerated pellets of PTFE which exhibit reduced spotting.

It is another object of the present invention to provide novel methods for preparing agglomerated pellets of PTFE which affords pellets exhibiting good flowability properties.

It is another object of the present invention to provide novel methods for preparing agglomerated pellets of PTFE which affords agglomerated pellets of PTFE which have a narrow uniform size distribution.

It is another object of the present invention to provide novel methods for preparing agglomerated pellets of PTFE which affords agglomerated pellets of PTFE which have an approximately spherical shape.

It is another object of the present invention to provide novel methods for preparing agglomerated pellets of PTFE which affords agglomerated pellets of PTFE which have a high hardness.

It is another object of the present invention to provide novel methods for preparing agglomerated pellets of PTFE which affords agglomerated pellets of PTFE which exhibit a reduced stickiness.

It is another object of the present invention to provide novel methods for preparing agglomerated pellets of PTFE which affords agglomerated pellets of PTFE which yield molded articles having good physical and mechanical properties.

It is another object of the present invention to provide the agglomerated pellets of PTFEs prepared by such a process.

It is another object of the present invention to provide novel methods for preparing molded articles from agglomerated pellets of PTFEs prepared by such a method.

It is another object of the present invention to provide the molded article prepared by such a method.

These and other objects, which will become apparent during the following detailed description, have been achieved by the present inventors' discovery that agglomerated pellets of PTFE having good properties may be prepared by a method, said method comprising:

(1) wetting a PTFE powder with a solvent, to obtain a wetted PTFE powder;

(2) forming said wetted PTFE powder into PTFE pellets; and (3) drying said PTFE pellets, wherein said drying of said PTFE pellets is carried out in a fluidized bed drier.

The inventors have also discovered that molded articles of PTFE having excellent properties may be prepared by a method, said method comprising:

(1) wetting a PTFE powder with a solvent, to obtain a wetted PTFE powder;

(2) forming said wetted PTFE powder into PTFE pellets;

(3) drying said PTFE pellets, to obtain dried PTFE pellets; and (4) molding said dried PTFE pellets, to obtain a molded article, wherein said drying of said PTFE pellets is carried out in a fluidized bed drier.

DETAILED DESCRIPTION OF THE PREFERRED EMBODIMENTS

Thus, in a first embodiment, the present invention provides a method for preparing agglomerated pellets of PTFE, said method comprising:

(1) wetting a PTFE powder with a solvent, to obtain a wetted PTFE powder;

(2) forming said wetted PTFE powder into PTFE pellets; and (3) drying said PTFE pellets, wherein said drying of said PTFE pellets is carried out in a fluidized bed drier.

The components and conditions used in the present method for preparing PTFE pellets will be described in detail below.

I. The PTFE Powder

The PTFE powder used as the starting material may be any conventional PTFE powder. The PTFE powder used in the present invention may be prepared by conventional suspension polymerization, and is preferably is, for example, a powder comprising a homopolymer of tetrafluoroethylene (TFE) or a copolymer of TFE and a monomer copolymerizable with TFE (modified PTFE or TFM). Examples of suitable homopolymers of TFE include FLUON commercially available from Asahi Glass Fluoropolymers and TEFLON commercially available from E. I. DuPont DeNemours & Company, Inc.

The molecular weight of PTFE is typically measured and reported in terms of standard specific gravity ("SSG") (see, e.g., U.S. Pat. Nos. 4,016,345; 4,576,869; and 6,177,533, which are incorporated herein by reference). The SSG may be measured by the method of ASTM D-4895. The starting PTFE used in the present method will typically have a SSG of 2.10 to 2.30, preferably 2.13 to 2.24.

Alternatively, it is possible to use as the starting PTFE powder a PTFE which has been irradiated to lower its molecular weight. Such irradiated PTFE typically exhibits an endotherm at a temperature of 320 to 350° C., preferably 325 to 340° C., as measured by differential scanning calorimetry ("DSC").

The average particle size of the PTFE powder, after the pulverization, is typically not larger than 200 $\mu$m, preferably not larger than 50 $\mu$m, and the lower limit thereof may be controlled by appropriate selection of the pulverizing apparatus and pulverizing technique. The powder will typically have a water content of not more than 0.1% by weight, preferably not more than 0.02% by weight, based on the total weight of the PTFE powder, after the drying. Examples of pulverizing apparatus for preparing the starting PTFE include for example, a hammer mill, a crusher equipped with a rotor having blades, a jet mill, and an impact mill.

It is also possible to use a water-containing PTFE powder as the starting PTFE powder in the present method. For example, PTFE powders having an average particle size of 200 to 1,000 µm and a water content of 5 to 30% by weight, based on the total weight of the PTFE powder, which may be prepared by pre-pulverizing, e.g., by means of a pipe line homomixer, coarse PTFE particles having an average particle size of 2 to 3 mm, which were prepared by the same suspension polymerization technique as the above-mentioned PTFE powder and taken out of the polymerization system. The so-prepared water-containing PTFE powder may then be poured into a mill, wet-pulverized, and classified by screening, to obtain a powder having an average particle size of 20 to 100 µm and a water content of 5 to 30% by weight, based on the total weight of the PTE powder. When the thus obtained water-containing powder is used, the drying step used for preparing the above-mentioned conventional PTFE powder is omitted.

As the monomer copolymerizable with TFE, there are, for example, a perfluoro(vinyl ether) represented by the formula (I):

wherein $R_\theta$ is a perfluoroalkyl group having 1 to 10 carbon atoms, a perfluoro(alkoxyalkyl) group having 4 to 9 carbon atoms, an organic group represented by the formula (II):

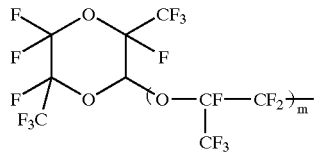

in which m is 0 or an integer of 1 to 4, or an organic group represented by the formula (III):

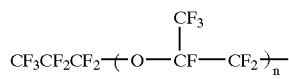

in which n is an integer of 1 to 4, and the like.

The number of carbon atoms of the above-mentioned perfluoroalkyl group is from 1 to 10, preferably from 1 to 5. When the number of carbon atoms is within the this range, creep resistance excellent is improved.

Preferred examples of the above-mentioned perfluoroalkyl group include, for example, perfluoromethyl, perfluoroethyl, perfluoropropyl, perfluorobutyl, perfluoropentyl, perfluorohexyl and the like. From the viewpoint of creep resistance and cost, perfluoropropyl is preferable.

When the proportion of the monomer copolymerizable with TFE is within the range of 1.0 to 0.001 mole %, based on the total moles of monomer in the PTFE, excellent creep resistance excellent may be obtained.

Particularly preferred copolymers are disclosed in U.S. Pat. Nos. 2,955,099; 2,946,763; 3,085,083; and 5,710,205, which are incorporated herein in their entireties.

The use of the above-mentioned PTFE powder particles or water-containing PTFE powder particles having the average particle size in the above-mentioned range affords PTFE pellets, by the method further described below, which have good powder flowability and an excellent apparent density, and in addition, the obtained molded articles obtained therefrom have good physical properties.

II. The Filler

In one preferred embodiment, the PTFE pellets prepared by the present method contain one or more fillers. Non-limiting examples of such fillers include, e.g., one or more metal fibers or metal powders such as bronze powder, bronze flake, gold powder, silver powder, copper powder, stainless steel powder, stainless steel fiber, stainless steel flake, nickel powder, and nickel fiber; inorganic fibers or inorganic powders such as glass fiber, graphite powder, glass beads, molybdenum disulfide powder, fluorinated mica powder, coke powder, carbon fiber, boron nitride powder, barium sulfate, carbon black (including conductive carbon black), and minerals and ceramics such as $TiO_2$, $Al_2O_3$, and $SiO_2$; organic powders such as heat-resistant aromatic resin powder, e.g. polyoxybenzoyl polyester, polyimide powder, tetrafluoroethylene-perfluoro(alkyl vinyl ether) copolymer (PFA) powder, polyphenylene sulfide (PPS) powder, polyether ether ketone (PEEK) powders, and pigments; and the like.

In the case where two or more fillers are used, preferable combinations include, for example: (1) glass fiber and graphite powder, (2) glass fiber and molybdenum disulfide powder, (3) bronze powder and molybdenum disulfide powder, (4) bronze powder and carbon fiber, (5) graphite powder and coke powder, (6) graphite powder and heat-resistive aromatic resin powder, (7) carbon fiber and heat-resistant aromatic resin powder, and the like.

A particularly preferred set of fillers are those combinations of poly(arylene sulfides) ("PS") and high aromatic polymers ("HAP" described in U.S. Pat. No. 5,710,205, which is incorporated herein by reference in its entirety.

The filler will typically have an average particle size ($D_{50}$) of from 1 µm to 1,000 µm, preferably 10 µm to 50 µm in the case of a powder. In the case of fibers, the filler will typically have an average fiber length of from 10 µm to 2,000 µm, preferably 50 µm to 800 µm, and a fiber diameter of 5 µm to 30 µm, preferably 10 µm to 20 µm.

The PTFE powder and the filler may be mixed by either a wet method and/or a dry method.

The filler is typically mixed with the PTFE powder in a proportion of 0.5 to 80% by weight, based on the total weight of the PTFE powder (the sum of the weight of the PTFE polymer and the filler). The preferred amount of filler will, of course, depend on the identity of the filler and the final application of the final molded article. However, in the case of a glass filler, the filler is preferably used in an amount of 15 to 25% by weight based on the sum of the weights of the filler and the PTFE powder. In the case of a bronze filler, the filler is preferably used in an amount of 30 to 60% by weight based on the sum of the weights of the filler and the PTFE powder. In the case of a polyimide filler, the filler is preferably used in an amount of 2 to 20% by weight based on the sum of the weights of the filler and the PTFE powder. In the case of a coke or carbon filler, the filler is preferably used in an amount of 5 to 30% by weight based on the sum of the weights of the filler and the PTFE powder. In the case of a PPS filler, the filler is preferably used in an amount of 5 to 20% by weight based on the sum of the weights of the filler and the PTFE powder.

In the case where a hydrophilic filler is used, there is the drawback that the filler is easily transferred into the liquid phase due to its hydrophilicity and is only difficultly mixed with the PTFE powder homogeneously. That is, a granular powder or pellets in which all the filler is mixed with the PTFE powder cannot be obtained, and a part of the filler remains in the treating liquid. This phenomenon is referred to as separation of filler. To cope with this problem, it may be preferable to use previously surface-treat the hydrophilic filler to render it hydrophobic, i.e., to lower its surface activity to near that of the PTFE powder.

Examples of the methods and compounds which may be used for the surface treatment of the filler include, e.g., (a) functional amino-containing silanes, phenyl-containing silanes, and/or soluble silicones (see, e.g., U.S. Pat. Nos. 3,929,721; 3,915,916; and 4,218,534, which are incorporated herein by reference); (b) monocarboxylic acids of hydrocarbons having 12 to 20 carbon atoms (see, e.g., JP-B-48-37576, which is incorporated herein by reference); (c) chromium complex compounds of an aliphatic carboxylic acids (see, e.g., JP-B-48-37576, which is incorporated herein by reference); (d) silicones (see, e.g., JP-A-53-139660, which is incorporated herein by reference); and (e) coating a hydrophilic filler with PTFE (see, e.g., JP-A-51-121417, which is incorporated herein by reference) is also known.

Examples of specific compounds which may be used for the surface treatment of the hydrophilic filler include, for example, aminosilane coupling agents such as γ-aminopropyltriethoxysilane ($H_2N(CH_2)_3Si(OC_2H_5)_3$); m- or p-aminophenyltriethoxysilane ($H_2N-C_6H_4-Si(OC_2H_5)_3$); γ-ureidopropyltriethoxysilane ($H_2NCONH(CH_2)_3Si(OC_2H_5)_3$); N-(β-aminoethyl)-γ-aminopropyltrimethoxysilane ($H_2N(CH_2)_2NH(CH_2)_3Si(OCH_3)_3$); and N-(β-aminoethyl)-γ-amino-propylmethyldimethoxysilane ($H_2N(CH_2)_2NH(CH_2)_3SiCH_3(OCH_3)_2$), and the like. In addition to those compounds, there may be used, for example, organosilane compounds such as phenyltrimethoxysilane, phenyltriethoxysilane, p-chlorophenyltrimethoxysilane, p-bromomethylphenyltrimethoxysilane, diphenyldimethoxysilane, diphenyldiethoxysilane and diphenylsilanediol; and fluorosilanes, such as those available from Huels.

Hydrophobic fillers can be used as is, without surface treatment.

III. The Solvent

The solvent used in the present method may be any that is suitable for wetting and agglomeration of PTFE. In a preferred embodiment, the present method uses an environmentally friendly solvent system for the wetting and agglomeration of the PTFE powder. In the context of the present invention, the term "environmentally friendly" refers to those solvents which have reduced volatility and therefore generate reduced or even no volatile emissions on use.

Particularly preferred for use in the present method are solvents which are mixtures of water and an organic solvent which has a vapor pressure higher than water. Examples of suitable organic solvents which have a vapor pressure higher than water include those from the list of suitable solvents given above, which have a vapor pressure higher than water.

A preferred class of solvents is described in U.S. Pat. No. 5,502,161 (which is incorporated herein by reference) and includes those selected from the group consisting of:

(a) ethylene glycol ethers, having the following general formula $C_nH_aO(C_2H_4O)_xH$ wherein n is an integer equal to from 3 to 8;

a is an integer equal to 2n+1, 2n−1, or 2n−3; and x is an integer equal to from 1 to 3, provided that when n equals 3, a is either 2n+1 or 2n−1, and when n equals 7 or 8, x is 2 or 3;

(b) propylene glycol ethers having the following general formula $C_nH_aO(C_3H_6O)_xH$ wherein n is an integer equal to 3 or 4;

a is an integer equal to 2n+1, 2n−1, or 2n−3; and x is an integer equal to 1 or 2 provided that when n equals 3, a is either 2n+1 or 2n−1; and (c) diols or triols having the following general formula $R-(OH)_x$ wherein R is a linear or branched chain, saturated or unsaturated hydrocarbon radical containing from 6 to 12 carbon atoms; and X is an integer equal to 2 or 3.

Another class of suitable solvents includes the acetylenic glycols of the formula $CH_3RC(OH){\equiv}C(OH)RCH_3$ wherein R is a group of the formula

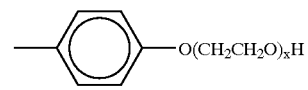

in which x is an integer equal to from 1 to 3.

Specific examples of suitable solvents include:

Diethylene glycol monohexyl ether;

Dipropylene glycol monobutyl ether;

Diethylene glycol monobutyl ether;

Surfynol 502, acetylenic diol blend;

Surfynol 82, 3,6-dihydroxy-3,6-dimethyl-4-octene;

Propylene glycol monobutyl ether;

Propylene glycol monopropyl ether;

1-Butanol;

iso-Butanol;

1-Propanol;

iso-Propanol;

Ethylene glycol monobutyl ether;

Hexylene glycol, 2,4-dihydroxy-2-methylpentane;

Ethanol;

2,2 Diethyl-1-3-propanediol (solid);

2 Ethyl-1,3-hexanediol;

Silwet L77, silicone based tetraethylene oxide adduct;

Surfynol 61, 3,5-dimethyl-3-hydroxy-1-hexene;

Triethylene glycol monohexyl ether;

Macol 48, alkoxylated alcohols;

Macol SF, silicone based;

Tetraethylene glycol monoheptyl ether;

Chemal TDA-3, triethylene glycol monotridecyl ether;

BRIJ 30, tetraethylene glycol monododecyl ether;

Renex 36, hexaethylene glycol monotridecyl ether;

Synthrapol KB, pentaethylene glycol monodecyl ether and hexaethylene glycol monodecyl ether;

Renex KB, polyethylene glycol monoalkyl ether;

Arlasolve 200L, diethylene glycol monohexadecyl ether;

BRIJ 97, decaethylene glycol mono-9-octadecylene ether;

BRIJ 76, decaethylene glycol monooctadecyl ether;

Triton XL-80N, $(EtO)_{8-10}(PrO)_{5-8}EtOH$;

Triton DF-16, $(EtO)_{8-10}(PrO)_{5-8}H$;

Tergitol MF-1X, $C_{12-14}H_{25-29}(EtO)_x(EtO/PrO)_yEtOH$;

Tergitol MF-2X, $C_{12-14}H_{25-29}(EtO)_x(EtO/PrO)_yPrOH$;

Chemeen C-2, $(EtO)_2$-cocoamine;

Surfynol 504, acetylenic diol blend;

Surfynol 420;

Surfynol 440;

Acetylenic glycol belnds;

Antarox 61, alkoxylated glycol (block);

Antarox 62, alkoxylated glycol (block);

1,6-Hexanediol (solid);

1,2-Dimethoxyethane;

Propylene glycol;

1,5-Pentanediol;

Ethylene glycol monomethyl ether;

1,3-Propanediol;

Glycerol;

Ethylene glycol;

Diethylene glycol dibutyl ether;

Butyl acetate;

Isopropyl acetate;

1-Pentanol;

Butyl formate;

Propyl formate;

Ethyl formate;

Pycal 94;

1,2-Pentanediol;

1,2-Hexanediol;

1,2-Octanediol;

2,5-Dimethyl-2,5-hexanediol;

2,5-Dimethyl-3-hexyne-2,5-diol;

2,2,6,6-Tetramethyl-3,5-heptanediol;

Sodium lauryl sulfate;

Propylene glycol monohexyl ether; and

Methanol.

Preferred ethylene glycol ethers which may be used are ethylene glycol monobutyl ether, diethylene glycol monobutyl ether, and diethylene glycol monohexyl ether. Preferred propylene glycol ethers are propylene glycol monopropyl ether, propylene glycol monobutyl ether, and dipropylene glycol monobutyl ether. Preferred diols or triols are: (a) 1,2-alkane diols such as 1,2-hexane diol, 1,2-heptanediol, and 1,2-octane diol; (b) 1,2,3-alkane triols such as 1,2,3-decane triol; and (c) alkynyl diols such as 3,6-dimethyl-4-octyne-3,6-diol. Of these, preferred results are achieved with the propylene glycol ethers. Of the ethers especially preferred results are achieved with dipropylene glycol monobutyl ether ("DPnB").

Particularly good results have been achieved with mixtures of DPnB and water. DPnB is commercially available from Dow under the tradename of DOWANOL.

Although the exact ratio of water to organic solvent will, of course, depend on the exact identity of the organic solvent being used, good results have been achieved with solvents comprising 60 to 99.5% by weight, preferably 94 to 98% by weight, of water and 0.5 to 40% by weight, preferably 2 to 6% by weight, of organic solvent, based on the total weight of the water and the organic solvent.

IV. Wetting the PTFE Powder

In the first step of the present method, the PTFE powder (with or without one or more fillers) is wetted with the solvent. Although the exact ratio of PTFE powder (including filler when present) will, of course, depend on the exact identity or the solvent being used, good results are normally achieved when the PTFE powder and the solvent are mixed in a weight ratio of from 1:1 to 10:1, preferably from 7:4 to 5:1.

The wetting of the PTFE powder with the solvent system may be carried out in any suitable apparatus, such as plow blenders, waring blenders, paddle blenders, ribbon blenders, with or without a high speed element. Particularly good results have been achieved with a Littleford Day 85 liter mixer.

V. Forming the Agglomerated Pellets of PTFE

After the PTFE powder (and filler, if present) has been wetted with the solvent system, the wetted PTFE powder is agglomerated into pellets or granules. This step may be carried out in any of the conventional ways for granulating PTFE powder, e.g., by stirring the wetted PTFE powder at a specified rate and intensity or by tumbling the wetted PTFE powder. A general discussion of agglomeration is provided in *Kirk-Othmer, Encyclopedia of Chemical Technology*, Fourth Ed., Wiley Interscience, New York, vol. 22, pp. 229–236 and 248–255 (1997), which is incorporated herein by reference. Suitable agglomerating apparatus and methods include double cone blenders, inclined pans or disks or rotating tubes. Typical equipment which may be utilized is described in U.S. Pat. Nos. 3,597,405 and 5,182,119.

The formation of the agglomerated pellets of PTFE is preferably carried out in a two stage process in which the wetted PTFE powder first passes through a mill and then passes through a densifier. Examples of suitable mills include hammer mills, cone mills, and homoloids.

In a preferred embodiment, the agglomerated pellets of PTFE are formed in a mill which contains a screen. In this way, the residence time of the PTFE passing through the mill can be controlled by changing the screen size between 0.01 inch to 0.1 inch, preferably 0.03 inch to 0.07 inch.

After the milled PTFE exits the mill it is then conveyed to a densifier. Examples of suitable densifiers include heated tube tumblers, pan pelletizers, vibratory decks, vibratory pans, or combinations thereof. The densified pellets of PTFE exiting the densifier typically have a particle size such that they pass through a 10 mesh screen. A particularly preferred heated tumbler is described in U.S. Pat. No. 5,182,119, which is incorporated herein by reference.

In a particularly preferred embodiment, the wetted PTFE is first milled in a hammer mill, then passed through a 0.04 inch screen onto a vibratory pan, then conveyed on the vibratory pan to a heated tube tumbler, and processed in the heated tube tumbler to afford wet agglomerated pellets of PTFE. Especially good results have been achieved with a hammer mill operating at a tip speed of about 60 ft/sec and a 30 inch heated tube tumbler operating at about 225° F. and 25 rpm.

The entire agglomeration may be carried out at room temperature. Alternatively, either or both of the milling and densification stages may be carried out with heating.

VI. Drying the PTFE Pellets

After the PTFE pellets have been formed, they are the dried in a fluidized bed drier. Fluidized bed drying is, per se, well known and the PTFE pellets may be dried in any conventional fluidized bed drier. A general discussion of fluidization is provided in *Kirk-Othmer, Encyclopedia of Chemical Technology*, Fourth Ed., Wiley Interscience, New York, vol. 11, pp. 138–171 (1994), which is incorporated herein by reference.

The fluidized bed drying of the PTFE pellets may be carried out in a batchwise or continuous fashion. In a preferred embodiment, the fluidized bed drying is carried out continuously. When using continuous fluidized bed drying, either a single zone or multizone apparatus may be used. The use of a multizone unit is preferred.

The time and temperature at which the fluidized bed drying is carried out will, in part, be determined by the vapor pressure and amount of the organic solvent component of the solvent system. In the case of the water-DPnB mixtures described above, good results have been achieved by batchwise drying for a time of 1 to 20 minutes, preferably 5 to 15 minutes, at an air temperature of 330 to 470° F., preferably 350 to 450° F., more preferably 370 to 430° F., with air flow rates ranging from 150 to 250 cfm (cubic feet per minute), preferably 175 to 225 cfm.

Good results may be also obtained by adjusting the residence time, air temperature, and air flow rates in a continuous fluidized bed unit to achieve similar overall drying conditions. For example, in the case of a three-zone fluidized bed drier good results may be achieved for pellets having a wet bulk density of about 58 pounds per cubic foot (PCF) and a dry bulk density of about 45 PCF, a particle size of 70% +30 mesh, and an initial moisture content of 25% by weight and an initial input temperature of about 70 to 90° F., by using a residence time of 2.5 to 10 minutes, preferably 5 to 7.5 minutes, more 5.5 to 7.0 minutes, in the drying zone, 2.5 to 10 minutes, preferably 5 to 7.5 minutes, more preferably 5.5 to 7.0 minutes, in the conditioning zone, and 1 to 10 minutes, preferably 2.5 to 7.5 minutes, more preferably 3.5 to 4.5 minutes, in the conditioning zone; and input rate of 500 to 900 pounds per hour (PPH), preferably about 720 PPH; an air temperature of 200 to 400° F., preferably about 300° F., in the drying zone, 300 to 450° F., preferably about 400° F., in the conditioning zone, and 50 to 75° F., preferably about 60 to 70° F., in the cooling zone; and an air flow rate sufficient to promote fluidization of the agglomerated PTFE.

After the agglomerated pellets have been dried, they may then be subjected to one of more of various other processing steps, such a baking or presintering, e.g., at a temperature greater than 625° F.

Preferably, the dried agglomerated pellets of PTFE are then classified by size. Typically, the dried agglomerated pellets are size classified by sieving with a screen configuration such that the agglomerated pellets pass through a 12 mesh screen and are retained by a 50 mesh screen, preferably the agglomerated pellets pass through a 14 mesh screen and are retained by a 44 mesh screen.

The bulk density of the agglomerated pellets of PTFE prepared by the present process will, of course, depend dramatically on the presence and identity of any filler. Thus, for example, agglomerated pellets of PTFE which contain a bronze filler will have a higher bulk density than agglomerated pellets of PTFE which contain no filler. However, the agglomerated pellets of PTFE prepared by the present method typically exhibit a bulk density of which is greater than pellets which are similar in regard to composition but are prepared with conventional drying. For example, agglomerated pellets of PTFE which contain about 15% by weight of a graphite filler and dried with conventional tray drying in an electric oven will typically have a bulk density of about 725 g/liter. In contrast, dying the same pellets in a fluidized bed dryer affords a product with a bulk density ranging from about 810 to about 835 g/liter.

Moreover, the PTFE pellets prepared by the present method exhibit good flowability, i.e., a flowability of 1 to 11 mm, preferably 1 to 7 mm, as measured by the method described below.

VII. Molding the Dried PTFE Pellets

After drying, the PTFE pellets may be packaged and sold as is. Alternatively, the dried pellets may be used for the production of molded PTFE articles. Due to its high viscosity, PTFE cannot be conveniently extruded as a thermoplastic. Accordingly, molded PTFE articles are typically prepared by filling a mold with the dried pellets and then forming the molded article by subjecting the pellets to heat and pressure. Typically, the molded article is formed by subjecting the pellets to a temperature of about 60° F. to 90° F., preferably about 70° F. to 78° F., and a pressure of 5,000 to 30,000 psi, preferably 6,000 to 10,000 psi, for a time of 20 seconds to 10 minutes, preferably 30 seconds to 5 minutes.

Although the pellets prepared by the present method may be used to form any type of molded article conventionally prepared form PTFE, it is particularly preferred to use the PTFE pellets prepared by the present method to prepare seals and piston rings.

The molded articles prepared from the PTFE pellets formed by the present method exhibit excellent properties. In particular, the molded articles prepared from filled agglomerated pellets of PTFE prepared by the present method exhibit excellent homogeneity and reduced spotting.

Moreover, the molded articles prepared from the agglomerated pellets of PTFE prepared according to the present method exhibit excellent physical and mechanical properties. For example, the molded articles prepared from filled agglomerated pellets of PTFE prepared by the present method exhibit excellent tensile elongation and tensile strength.

Other features of the invention will become apparent in the course of the following descriptions of exemplary embodiments, which are given for illustration of the invention and are not intended to be limiting thereof.

EXAMPLES

In the following examples, all percentages are given in terms of % by weight, all temperatures are given in ° F., and all molecular weights are given in weight average molecular weight, unless otherwise explicitly stated.

Examples 1–11

Agglomerated pellets of PTFE filled with graphite were prepared as follows. First, 90.10 lbs of PTFE G-586 Fluon Granular, obtained from Asahi Glass Fluoropolymers, was premixed with 15.90 lbs of 80 mesh sifted/demagnetized 5026C graphite, obtained from Superior Graphite. Then the PTFE-graphite mixture was mixed in a 85 liter Littleford mixer for 8 minutes dry and then for 2 minutes with 5.2 gallons of a solvent containing 96% by weight of reverse-osmosis purified water and 4% by weight of DPnB, obtained from Dow Chemical.

Thereafter, the PTFE-graphite mixture was passed through a hammer mill and then passed through a 0.040 inch screen onto a vibrating deck which conveyed the mixture to a 30 inch diameter heated tumbler operating at a temperature of 225° F. and a tumbling speed of 25 rpm.

The resulting agglomerated pellets of PTFE were then dried in a Carrier 1 ft² batch fluidized bed drier operating under the conditions shown in Table 1 below.

TABLE 1

| Example No. | Charge Amount (lbs.) | First Stage; Time (min) @Temperature (° F.) | Second Stage; Time (min) @ Temperature (° F.) | Air Flow (cfm) |
|---|---|---|---|---|
| 1 | 10 | 8 min @ 300° F. | 0 min @ 0° F. | 160 |
| 2 | 10 | 8 min @ 300° F. | 10 min @ 370° F. | 160 |
| 3 | 10 | 8 min @ 300° F. | 5 min @ 400° F. | 160 |
| 4 | 10 | 8 min @ 300° F. | 10 min @ 400° F. | 160 |
| 5 | 10 | 8 min @ 300° F. | 15 min @ 400° F. | 160 |
| 6 | 10 | 8 min @ 300° F. | 10 min @ 430° F. | 160 |
| 7 | 10 | 6 min @ 300° F. | 5 min @ 400° F. | 195 |
| 8 | 10 | 8 min @ 300° F. | 5 min @ 400° F. | 160 |
| 9 | 10 | 4 min @ 400° F. | 5 min @ 400° F. | 160 |
| 10 | 10 | 7 min @ 300° F. | 10 min @ 370° F. | 195 |
| 11 | 10 | 6 min @ 300° F. | 10 min @ 400° F. | 160 |

Comparative Example 1

The historical mean for analogous agglomerated pellets of PTFE prepared in a similar manner except for the use of tray drying in an electric oven rather than drying in a fluidized bed drier was taken as Comparative Example. The agglomerated pellets were placed on an approximately 1 m² tray at a depth of about 1 inch and dried in an electric oven at 380° F. for 8 hours and then at 600° F. for 6 hours.

RESULTS

The bulk Density, Filler Content, and Slit were measured for each agglomerated pellets of each Examples 1–11, as follows.

Bulk Density: The Bulk Density was measured according to ASTM 4745.

The Filler Content as % by weight based on the total weight of the pellets after drying was determined by ASTM 4745.

Slit Flow was measured by placing 100 g of agglomerated pellets in V-shaped trough an internal angle of 60° and a movable gate on one side of the bottom of the trough. The gate is closed when the pellets are placed in the trough and then gradually opened by sliding upward at a rate of 12.7 mm per minute. As the gate opens, the pellets flow through the open gate onto an electronic balance. The width of the opening when 50 g of the pellets have passed through the gate is determined as the Slit Flow as measured in mm. The results are shown in Table 2 below.

TABLE 2

| Example | Properties | | |
|---|---|---|---|
| | Bulk Density (g/liter) | Filler Content (% by weight) | Slit Flow (mm) |
| 1 | 816 | 14.1 | 4.3 |
| 2 | 820 | 14.1 | 3.6 |
| 3 | 816 | 14.4 | 3.6 |
| 4 | 828 | 14.2 | 4.0 |
| 5 | 836 | 14.2 | 3.6 |
| 6 | 836 | 14.2 | 4.0 |
| 7 | 812 | 14.1 | 3.6 |
| 8 | 828 | 14.0 | 4.0 |
| 9 | 824 | 14.2 | 3.6 |
| 10 | 820 | 14.2 | 4.0 |
| 11 | 816 | 14.2 | 4.6 |
| trial max | 836 | 14.4 | 4.6 |
| trial min | 812 | 14.0 | 3.6 |
| trial range | 24 | 0.4 | 1.0 |
| Comparative Example 1 (historical mean) | 725 | 14.6 | 7.9 |
| historical st dev | 19.61 | 0.3 | 1.6 |

Examples 12–22

The agglomerated pellets obtained in Examples 1–11 were molded using the method described in ASTM D 4745-01 to obtain the billets of Examples 12–22, respectively.

Comparative Example 2

The historical mean for analogous billets molded from agglomerated pellets of PTFE prepared in a similar manner except for the use of tray drying in an electric oven rather than drying in a fluidized bed drier was taken as Comparative Example 2. The agglomerated pellets were prepared as described in Comparative Example 1.

Results

The Tensile Strength, Tensile Elongation, Shrinkage, and Standard Specific Gravity (SSG) of the billets of Examples 12–22 and Comparative Example 2 were measured as follows:

Tensile Strength: The Tensile Strength was measured in accordance with ASTM D 4745.

Tensile Elongation: The Tensile Elongation was measured by ASTM D 4745.

Shrinkage: The Shrinkage of the billets was measured according to ASTM D 1457.

Standard Specific Gravity (SSG): The SSG was measured according to ASTM D 792.

The results are given in Table 3 below:

TABLE 3

| Example | Properties | | | |
|---|---|---|---|---|
| | Tensile Strength (units) | Tensile Elongation (units) | Shrinkage (units) | SSG |
| 12 | 2536 | 110 | 2.53 | 2.14 |
| 13 | 2480 | 108 | 2.64 | 2.13 |
| 14 | 2583 | 131 | 2.70 | 2.13 |
| 15 | 2419 | 120 | 2.53 | 2.13 |
| 16 | 2363 | 111 | 2.70 | 2.14 |
| 17 | 2429 | 108 | 2.70 | 2.13 |
| 18 | 2566 | 111 | 2.47 | 2.13 |
| 19 | 2521 | 123 | 2.47 | 2.13 |
| 20 | 2444 | 124 | 2.58 | 2.13 |
| 21 | 2503 | 103 | 2.53 | 2.13 |
| 22 | 2590 | 118 | 2.64 | 2.13 |
| trial max | 2590 | 131 | 2.70 | 2.14 |
| trial min | 2363 | 103 | 2.47 | 2.13 |

TABLE 3-continued

| Example | Tensile Strength (units) | Tensile Elongation (units) | Shrinkage (units) | SSG |
|---|---|---|---|---|
| trial range | 227 | 28 | 0.23 | 0.01 |
| Comparative Example 2 (historical mean) | 2051 | 123 | 2.59 | 2.13 |
| historical st dev | 101 | 12.7 | 0.13 | 0.01 |

The results given in Table 3 show that the molded articles prepared from the agglomerated pellets prepared according to the present invention exhibit a remarkably improved Tensile Strength as compared to analogous billets prepared from pellets which have been prepared using tray drying in an electric oven.

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in fall herein by this reference, the same as if set forth at length.

What is claimed is:

1. A method for preparing agglomerated pellets of PTFE, said method comprising:
   (1) wetting a PTFE powder with a solvent, to obtain a wetted PTFE powder;
   (2) forming said wetted PTFE powder into agglomerated pellets of PTFE; and
   (3) drying said agglomerated pellets of PTFE,
wherein said drying of said agglomerated pellets of PTFE is carried out in a fluidized bed drier.

2. The method of claim 1, wherein said PTFE powder comprises a homopolymer of tetrafluoroethylene.

3. The method of claim 1, wherein said PTFE powder comprises a copolymer of tetrafluoroethylene and a copolymerizable comonomer.

4. The method of claim 1, wherein said solvent is selected from the group consisting of:
   (a) ethylene glycol ethers having the following formula:

$$C_nH_aO(C_2H_4O)_xH$$

wherein
   n is an integer equal to from 3 to 8;
   a is an integer equal to 2n+1, 2n−1, or 2n−3; and
   x is an integer equal to from 1 to 3, provided that when n equals 3, a is either 2n+1 or 2n−1, and when n equals 7 or 8, x is 2 or 3;
   (b) propylene glycol ethers having the following formula:

$$C_nH_aO(C_3H_6O)_xH$$

wherein
   n is an integer equal to 3 or 4;
   a is an integer equal to 2n+1, 2n−1, or 2n−3; and
   x is an integer equal to 1 or 2 provided that when n equals 3, a is either 2n+1 or 2n−1;
   (c) diols and triols having the following formula:

$$R\text{—}(OH)_x$$

wherein
   R is a linear or branched chain, saturated or unsaturated hydrocarbon radical containing from 6 to 12 carbon atoms; and
   x is an integer equal to 2 or 3;
   (d) acetylenic glycols of the formula:

$$CH_3RC(OH)\text{—}C\equiv C\text{—}C(OH)RCH_3$$

wherein
   R is a group of the formula

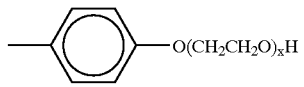

in which x is an integer equal to from 1 to 3;
   (e) mixtures thereof; and
   (f) mixtures thereof with water.

5. The method of claim 1, wherein said solvent has a vapor pressure higher than water.

6. The method of claim 1, wherein said solvent is a mixture of water and dipropylene glycol monobutyl ether.

7. The method of claim 1, wherein said PTFE powder comprises a mixture of PTFE and a filler.

8. The method of claim 7, wherein said filler is selected from the group consisting of bronze powder, gold powder, silver powder, copper powder, stainless steel powder, stainless steel fiber, nickel powder, nickel fiber, glass fiber, graphite powder, molybdenum disulfide powder, fluorinated mica powder, coke powder, carbon fiber, boron nitride powder, carbon black, heat-resistant aromatic resin powders, and mixtures thereof.

9. The method of claim 8, wherein said heat-resistant aromatic resin powders are selected from the group consisting of polyoxybenzoyl polyesters, polyimide powders, tetrafluoroethylene-perfluoro(alkyl vinyl ether) copolymer (PFA) powders, polyphenylene sulfide powders, and mixtures thereof.

10. The method of claim 7, wherein said filler is a combination of two or more fillers and said combination of two or more fillers comprises a pair of fillers selected from the group consisting of (1) glass fiber and graphite powder, (2) glass fiber and molybdenum disulfide powder, (3) bronze powder and molybdenum disulfide powder, (4) bronze powder and carbon fiber, (5) graphite powder and coke powder, (6) graphite powder and heat-resistive aromatic resin powder, and (7) carbon fiber and heat-resistant aromatic resin powder.

11. The method of claim 7, wherein said filler is a powder and has an average particle size, $D_{50}$, of from 1 μm to 1,000 μm.

12. The method of claim 7, wherein said filler is a fiber and has an average fiber length of from 10 μm to 2,000 μm.

13. The method of claim 7, wherein said filler is present in an amount of 0.5 to 80% by weight, based on the total weight of said PTFE powder.

14. Agglomerated pellets of PTFE, prepared by a process comprising:
   (1) wetting a PTFE powder with a solvent, to obtain a wetted PTFE powder;
   (2) forming said wetted PTFE powder into agglomerated pellets of PTFE; and
   (3) drying said agglomerated pellets of PTFE,
wherein said drying said agglomerated pellets of PTFE is carried out in a fluidized bed drier.

15. The agglomerated pellets of PTFE of claim 14, wherein said PTFE powder comprises a homopolymer of tetrafluoroethylene.

16. The agglomerated pellets of PTFE of claim 14, wherein said PTFE powder comprises a copolymer of tetrafluoroethylene and a copolymerizable comonomer.

17. The agglomerated pellets of PTFE of claim 14, wherein said solvent is selected from the group consisting of:

(a) ethylene glycol ethers having the following formula:

$$C_nH_aO(C_2H_4O)_xH$$

wherein n is an integer equal to from 3 to 8;

a is an integer equal to 2n+1, 2n−1, or 2n−3; and x is an integer equal to from 1 to 3, provided that when n equals 3, a is either 2n+1 or 2n−1, and when n equals 7 or 8, x is 2 or 3;

(b) propylene glycol ethers having the following formula:

$$C_nH_aO(C_3H_6O)_xH$$

wherein n is an integer equal to 3 or 4;

a is an integer equal to 2n+1, 2n−1, or 2n−3; and x is an integer equal to 1 or 2 provided that when n equals 3, a is either 2n+1 or 2n−1;

(c) diols and triols having the following formula:

$$R\text{—}(OH)_x$$

wherein

R is a linear or branched chain, saturated or unsaturated hydrocarbon radical containing from 6 to 12 carbon atoms; and x is an integer equal to 2 or 3;

(d) acetylenic glycols of the formula:

$$CH_3RC(OH)\text{—}\equiv C\text{—}(OH)RCH_3$$

wherein

R is a group of the formula

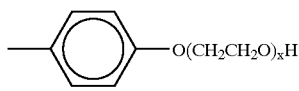

in which x is an integer equal to from 1 to 3;

(e) mixtures thereof; and (f) mixtures thereof with water.

18. The agglomerated pellets of PTFE of claim 14, wherein said solvent has a vapor pressure higher than water.

19. The agglomerated pellets of PTFE of claim 14, wherein said solvent is a mixture of water and dipropylene glycol monobutyl ether.

20. The agglomerated pellets of PTFE of claim 14, wherein said PTFE powder comprises a mixture of PTFE and a filler.

21. The agglomerated pellets of PTFE of claim 20, wherein said filler is selected from the group consisting of bronze powder, gold powder, silver powder, copper powder, stainless steel powder, stainless steel fiber, nickel powder, nickel fiber, glass fiber, graphite powder, molybdenum disulfide powder, fluorinated mica powder, coke powder, carbon fiber, boron nitride powder, carbon black, heat-resistant aromatic resin powders, and mixtures thereof.

22. The agglomerated pellets of PTFE of claim 21, wherein said heat-resistant aromatic resin powders are selected from the group consisting of polyoxybenzoyl polyesters, polyimide powders, tetrafluoroethylene-perfluoro(alkyl vinyl ether) copolymer (PFA) powders, polyphenylene sulfide powders, and mixtures thereof.

23. The agglomerated pellets of PTFE of claim 20, wherein said filler is a combination of two or more fillers and said combination of two or more fillers comprises a pair of fillers selected from the group consisting of (1) glass fiber and graphite powder, (2) glass fiber and molybdenum disulfide powder, (3) bronze powder and molybdenum disulfide powder, (4) bronze powder and carbon fiber, (5) graphite powder and coke powder, (6) graphite powder and heat-resistive aromatic resin powder, and (7) carbon fiber and heat-resistant aromatic resin powder.

24. The agglomerated pellets of PTFE of claim 20, wherein said filler is a powder and has an average particle size, $D_{50}$, of from 1 μm to 1,000 μm.

25. The agglomerated pellets of PTFE of claim 20, wherein said filler is a fiber and has an average fiber length of from 10 μm to 2,000 μm.

26. The agglomerated pellets of PTFE of claim 20, wherein said filler is present in an amount of 0.5 to 80% by weight, based on the total weight of said PTFE powder.

27. A method for preparing a molded article of PTFE, said method comprising:

(1) wetting a PTFE powder with a solvent, to obtain a wetted PTFE powder;

(2) forming said wetted PTFE powder into agglomerated pellets of PTFE;

(3) drying said agglomerated pellets of PTFE, to obtain dried agglomerated pellets of PTFE; and (4) molding said dried agglomerated pellets of PTFE, to obtain a molded article, wherein said drying of said agglomerated pellets of PTFE is carried out in a fluidized bed drier.

28. The method of claim 27, wherein said PTFE powder comprises a homopolymer of tetrafluoroethylene.

29. The method of claim 27, wherein said PTFE powder comprises a copolymer of tetrafluoroethylene and a copolymerizable comonomer.

30. The method of claim 27, wherein said solvent is selected from the group consisting of:

(a) ethylene glycol ethers having the following formula:

$$C_nH_aO(C_2H_4O)_xH$$

wherein n is an integer equal to from 3 to 8;

a is an integer equal to 2n+1, 2n−1, or 2n−3; and x is an integer equal to from 1 to 3, provided that when n equals 3, a is either 2n+1 or 2n−1, and when n equals 7 or 8, x is 2 or 3;

(b) propylene glycol ethers having the following formula:

$$C_nH_aO(C_3H_6O)_xH$$

wherein n is an integer equal to 3 or 4;

a is an integer equal to 2n+1, 2n−1, or 2n−3; and x is an integer equal to 1 or 2 provided that when n equals 3, a is either 2n+1 or 2n−1;

(c) diols and triols having the following formula:

$$R\text{—}(OH)_x$$

wherein

R is a linear or branched chain, saturated or unsaturated hydrocarbon radical containing from 6 to 12 carbon atoms; and x is an integer equal to 2 or 3;

(d) acetylenic glycols of the formula:

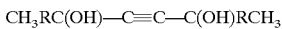

wherein

R is a group of the formula

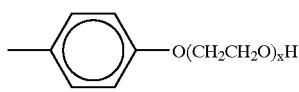

in which x is an integer equal to from 1 to 3;

(e) mixtures thereof; and (f) mixtures thereof with water.

31. The method of claim 27, wherein said solvent has a vapor pressure higher than water.

32. The method of claim 27, wherein said solvent is a mixture of water and dipropylene glycol monobutyl ether.

33. The method of claim 27, wherein said PTFE powder comprises a mixture of PTFE and a filler.

34. The method of claim 33, wherein said filler is selected from the group consisting of bronze powder, gold powder, silver powder, copper powder, stainless steel powder, stainless steel fiber, nickel powder, nickel fiber, glass fiber, graphite powder, molybdenum disulfide powder, fluorinated mica powder, coke powder, carbon fiber, boron nitride powder, carbon black, heat-resistant aromatic resin powders, and mixtures thereof.

35. The method of claim 34, wherein said heat-resistant aromatic resin powders are selected from the group consisting of polyoxybenzoyl polyesters, polyimide powders, tetrafluoroethylene-perfluoro(alkyl vinyl ether) copolymer (PFA) powders, polyphenylene sulfide powders, and mixtures thereof.

36. The method of claim 33, wherein said filler is a combination of two or more fillers and said combination of two or more fillers comprises a pair of fillers selected from the group consisting of (1) glass fiber and graphite powder, (2) glass fiber and molybdenum disulfide powder, (3) bronze powder and molybdenum disulfide powder, (4) bronze powder and carbon fiber, (5) graphite powder and coke powder, (6) graphite powder and heat-resistive aromatic resin powder, and (7) carbon fiber and heat-resistant aromatic resin powder.

37. The method of claim 33, wherein said filler is a powder and has an average particle size, $D_{50}$, of from 1 μm to 1,000 μm.

38. The method of claim 33, wherein said filler is a fiber and has an average fiber length of from 10 μm to 2,000 μm.

39. The method of claim 33, wherein said filler is present in an amount of 0.5 to 80% by weight, based on the total weight of said PTFE powder.

40. A molded PTFE article, prepared by a process comprising:

(1) wetting a PTFE powder with a solvent, to obtain a wetted PTFE powder;

(2) forming said wetted PTFE powder into agglomerated pellets of PTFE;

(3) drying said agglomerated pellets of PTFE, to obtain dried agglomerated pellets of PTFE; and (4) molding said dried agglomerated pellets of PTFE, to obtain a molded article, wherein said drying said agglomerated pellets of PTFE is carried out in a fluidized bed drier.

41. The molded PTFE article of claim 40, wherein said PTFE powder comprises a homopolymer of tetrafluoroethylene.

42. The molded PTFE article of claim 40, wherein said PTFE powder comprises a copolymer of tetrafluoroethylene and a copolymerizable comonomer.

43. The molded PTFE article of claim 40, wherein said solvent is selected from the group consisting of:

(a) ethylene glycol ethers having the following formula:

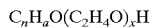

wherein n is an integer equal to from 3 to 8;

a is an integer equal to 2n+1, 2n−1, or 2n−3; and x is an integer equal to from 1 to 3, provided that when n equals 3, a is either 2n+1 or 2n−1, and when n equals 7 or 8, x is 2 or 3;

(b) propylene glycol ethers having the following formula:

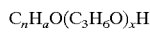

wherein n is an integer equal to 3 or 4;

a is an integer equal to 2n+1, 2n−1, or 2n−3; and x is an integer equal to 1 or 2 provided that when n equals 3, a is either 2n+1 or 2n−1;

(c) diols and triols having the following formula:

wherein

R is a linear or branched chain, saturated or unsaturated hydrocarbon radical containing from 6 to 12 carbon atoms; and x is an integer equal to 2 or 3;

(d) acetylenic glycols of the formula:

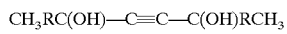

wherein

R is a group of the formula

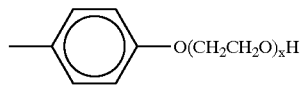

in which x is an integer equal to from 1 to 3;

(e) mixtures thereof; and (f) mixtures thereof with water.

44. The molded PTFE article of claim 40, wherein said solvent has a vapor pressure higher than water.

45. The molded PTFE article of claim 40, wherein said solvent is a mixture of water and dipropylene glycol monobutyl ether.

46. The molded PTFE article of claim 40, wherein said PTFE powder comprises a mixture of PTFE and a filler.

47. The molded PTFE article of claim 46, wherein said filler is selected from the group consisting of bronze powder, gold powder, silver powder, copper powder, stainless steel powder, stainless steel fiber, nickel powder, nickel fiber, glass fiber, graphite powder, molybdenum disulfide powder, fluorinated mica powder, coke powder, carbon fiber, boron nitride powder, carbon black, heat-resistant aromatic resin powders, and mixtures thereof.

48. The molded PTFE article of claim 47, wherein said heat-resistant aromatic resin powders are selected from the group consisting of polyoxybenzoyl polyesters, polyimide powders, tetrafluoroethylene-perfluoro(alkyl vinyl ether) copolymer (PFA) powders, polyphenylene sulfide powders, and mixtures thereof.

49. The molded PTFE article of claim 46, wherein said filler is a combination of two or more fillers and said combination of two or more fillers comprises a pair of fillers selected from the group consisting of (1) glass fiber and graphite powder, (2) glass fiber and molybdenum disulfide powder, (3) bronze powder and molybdenum disulfide powder, (4) bronze powder and carbon fiber, (5) graphite powder and coke powder, (6) graphite powder and heat-resistive aromatic resin powder, and (7) carbon fiber and heat-resistant aromatic resin powder.

50. The molded PTFE article of claim 46, wherein said filler is a powder and has an average particle size, $D_{50}$, of from 1 $\mu$m to 1,000 $\mu$m.

51. The molded PTFE article of claim 46, wherein said filler is a fiber and has an average fiber length of from 10 $\mu$m to 2,000 $\mu$m.

52. The molded PTFE article of claim 46, wherein said filler is present in an amount of 0.5 to 80% by weight, based on the total weight of said PTFE powder.

\* \* \* \* \*

UNITED STATES PATENT AND TRADEMARK OFFICE
CERTIFICATE OF CORRECTION

PATENT NO.    : 6,911,489 B2
DATED         : June 28, 2005
INVENTOR(S)   : Pamela J. Baron et al.

It is certified that error appears in the above-identified patent and that said Letters Patent is hereby corrected as shown below:

Column 4,
Line 42, delete "is" after "and".

Column 5,
Line 29, " 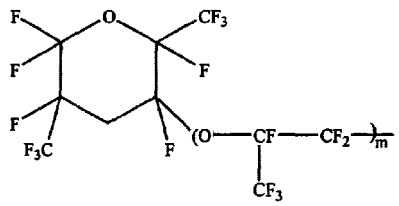 " should read -- $R_f$ --.

Lines 32-39, delete Formula II in its entirety and replace with the following:

Lines 52 and 62, "excellent" should read -- excellence --.

Column 9,
Line 19, "belnds" should read -- blends --.

Column 11,
Line 49, "a baking" should read -- as baking… --.

Column 15,
Line 25, "fall" should read -- full --.

Signed and Sealed this

Eighth Day of November, 2005

JON W. DUDAS
*Director of the United States Patent and Trademark Office*